United States Patent
Dash et al.

(10) Patent No.: US 9,959,180 B1
(45) Date of Patent: *May 1, 2018

(54) SYSTEMS AND METHODS FOR SHIPPING AN I/O OPERATION TO PREVENT REPLICATION FAILURE

(71) Applicant: Veritas Technologies LLC, Mountain View, CA (US)

(72) Inventors: Prasanta Dash, San Jose, CA (US); Yatin Nayak, San Jose, CA (US); Kirubakaran Kaliannan, Beaverton, OR (US); Satyendra Thakur, Sunnyvale, CA (US)

(73) Assignee: Veritas Technologies LLC, Mountain View, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 14/939,574

(22) Filed: Nov. 12, 2015

Related U.S. Application Data

(63) Continuation of application No. 13/485,902, filed on May 31, 2012, now Pat. No. 9,218,256.

(51) Int. Cl.
*G06F 11/20* (2006.01)
*G06F 11/07* (2006.01)

(52) U.S. Cl.
CPC ...... *G06F 11/2017* (2013.01); *G06F 11/0745* (2013.01); *G06F 11/0787* (2013.01); *G06F 2201/85* (2013.01)

(58) Field of Classification Search
USPC ...................................................... 714/4.11
See application file for complete search history.

(56) References Cited

U.S. PATENT DOCUMENTS

| | | | | |
|---|---|---|---|---|
| 5,991,797 A * | 11/1999 | Futral | ...................... | G06F 9/54 709/216 |
| 6,629,264 B1 * | 9/2003 | Sicola | ................. | G06F 11/2007 714/15 |
| 7,685,385 B1 * | 3/2010 | Choudhary | ......... | G06F 11/1471 711/162 |
| 8,677,088 B1 * | 3/2014 | Patil | .................... | G06F 11/1658 711/162 |
| 8,775,549 B1 * | 7/2014 | Taylor | ................. | H04L 67/1097 707/609 |
| 9,218,256 B1 * | 12/2015 | Dash | .................... | G06F 11/2074 |
| 2004/0006439 A1 * | 1/2004 | Hunter | ................... | G01D 4/004 702/61 |
| 2004/0039888 A1 * | 2/2004 | LeCrone | ............. | G06F 11/2076 711/162 |

(Continued)

*Primary Examiner* — Kamini B Patel
(74) *Attorney, Agent, or Firm* — FisherBroyles LLP

(57) ABSTRACT

A computer-implemented method for shipping I/O operations to prevent replication failure may include 1) attempting to perform an I/O operation in a system configured to replicate data from a data cluster to another data cluster, 2) detecting a failure in at least part of the attempt to perform the I/O operation that threatens to fail the system's replication of data from the data cluster to the other data cluster, and, in response to detecting the failure, 3) shipping the I/O operation from a node originally responsible for servicing the I/O operation to another node to complete the I/O operation without failing the system's replication of data from the data cluster to the other data cluster. Various other methods, systems, and computer-readable media are also disclosed.

20 Claims, 7 Drawing Sheets

(56) References Cited

U.S. PATENT DOCUMENTS

| | | | |
|---|---|---|---|
| 2004/0064639 A1 | 4/2004 | Sicola et al. | |
| 2009/0271582 A1* | 10/2009 | Ninose | G06F 11/2069 711/162 |
| 2011/0153562 A1* | 6/2011 | Howard | G06F 17/30581 707/620 |
| 2011/0282834 A1* | 11/2011 | Desai | G06F 11/2097 707/611 |
| 2012/0144233 A1* | 6/2012 | Griffith | G06F 11/1443 714/13 |

* cited by examiner

SYSTEMS AND METHODS FOR SHIPPING AN I/O OPERATION TO PREVENT REPLICATION FAILURE

CROSS REFERENCE TO RELATED APPLICATION

This application is a continuation of U.S. application Ser. No. 13/485,902, filed 31 May 2012, the disclosure of which is incorporated, in its entirety, by this reference.

BACKGROUND

Individuals and businesses often seek ways to prevent the unintended loss of valuable data. For example, an entity may back up data by replicating the data from one storage unit to another storage unit. In some cases, the original storage unit, and/or the destination storage unit, may belong to a data cluster.

Data clusters often use replication logs to record I/O operations performed on either the original storage unit or the destination storage unit. Since a replication log may be separated from its corresponding storage unit, a data cluster may be able access this log even if it is unable to access the corresponding storage unit, or vice versa.

In conventional systems, if a data cluster is unable to access an object (e.g., a storage unit or log) required to replicate data from one storage unit to another, the data cluster may either (1) allow the I/O operation to continue but fail replication or (2) fail both the I/O operation and replication. In either case, however, replication fails.

Replication failure is undesirable for numerous reasons. For example, replication failure may require that all data be completely resynchronized. Replication failure may also lead to data inconsistencies on the destination site. Given the limited bandwidth that is typically available between source and designation (i.e., recovery) sites, even optimized resynchronization solutions may introduce a significant performance overhead.

SUMMARY

As will be described in greater detail below, the instant disclosure generally relates to systems and methods for shipping I/O operations to prevent replication failure. In one example, a computer-implemented method for shipping I/O operations to prevent replication failure may include 1) attempting to perform an I/O operation in a system configured to replicate data from a data cluster to another data cluster, 2) detecting a failure in at least part of the attempt to perform the I/O operation that threatens to fail the system's replication of data from the data cluster to the other data cluster, and 3) in response to detecting the failure, shipping the I/O operation from a node originally responsible for servicing the I/O operation to another node to complete the I/O operation without failing the system's replication of data from the data cluster to the other data cluster.

In some examples, the method may include 1) determining a performance impact of shipping the I/O operation from the node originally responsible for servicing the I/O operation to the other node and then 2) determining that the performance impact satisfies at least one performance-related criteria.

The method may also include determining, at a later point in time, that the performance impact of shipping the I/O operation from the node originally responsible for servicing the I/O operation to the other node fails to satisfy the performance-related criteria. In this example, the method may also include gracefully stopping, on a node where the failure occurred, an application that caused the attempt to perform the I/O operation.

In some examples, shipping the I/O operation may include determining that the I/O operation represents a replication I/O operation associated with the system's replication of data from the data cluster to the other data cluster, as opposed to an application I/O operation associated with servicing an application. In these examples, shipping the I/O operation may be performed in response to the determination.

In one example, the node originally responsible for servicing the I/O operation may include a node within the other data cluster. In this example, shipping the I/O operation may also include 1) determining that the failure is non-permanent and/or non-global and then 2) shipping the I/O operation in response to this determination.

The detection of the failure may also occur during 1) an initial synchronization operation that automatically performs synchronization to ensure that the other data cluster is up to date with the data cluster, 2) a full synchronization operation that transfers all data between the data cluster and the other data cluster, and/or 3) an incremental or differential synchronization operation that transfers only differing data between the data cluster and the other data cluster. In these examples, the step of shipping the I/O operation may include shipping a minimal, or substantially minimal, degree of I/O operations to prevent replication failure while waiting for connectivity to be restored. Upon resumption of connectivity, further I/O operations may proceed at the node where the failure occurred or at another node.

In some examples, the system configured to replicate data from the data cluster to the other data cluster may implement a replication log. In one example, this replication log may represent a bunker replication log for bunker-based replication in which the data cluster and the other data cluster are physically isolated from each other. The replication log, and a receiving data volume that receives the attempt to perform the I/O operation, may be stored on separate storage devices. The failure may include a failure to access the receiving data volume.

In some embodiments, the node originally responsible for servicing the I/O operation may include a node within the data cluster. The failure may include a failure to write to the receiving data volume after the write has been recorded in the replication log. Shipping the I/O operation may include shipping an application I/O operation associated with servicing an application. The method may further include shipping the write preserved in the replication log to the other node.

In some examples, the failure may include a failure to access the replication log. The I/O operation may include an I/O operation on the replication log. Shipping the I/O operation may include shipping the I/O operation so that the I/O operation is performed on the replication log by the other node.

The method may further include, in response to detecting the failure, switching a log maintenance role associated with the replication log from a current node to a different node. In addition, detecting the failure may include detecting the failure during a recovery operation that attempts to recover replicated data in response to a previous failure.

In one example, the I/O operation may include an I/O operation on a data change map. In this example, the data change map may indicate where data differs between the data cluster and the other data cluster.

In one embodiment, a system for implementing the above-described method may include 1) an I/O module programmed to attempt to perform an I/O operation in a system configured to replicate data from a data cluster to another data cluster, 2) a detection module programmed to detect a failure in at least part of the attempt to perform the I/O operation that threatens to fail the system's replication of data from the data cluster to the other data cluster, 3) a shipping module programmed to, in response to detecting the failure, ship the I/O operation from a node originally responsible for servicing the I/O operation to another node to complete the I/O operation without failing the system's replication of data from the data cluster to the other data cluster, and 4) at least one processor configured to execute the I/O module, the detection module, and the shipping module.

In some examples, the above-described method may be encoded as computer-readable instructions on a computer-readable-storage medium. For example, a computer-readable-storage medium may include one or more computer-executable instructions that when executed by at least one processor of a computing device, may cause the computing device to 1) attempt to perform an I/O operation in a system configured to replicate data from a data cluster to another data cluster, 2) detect a failure in at least part of the attempt to perform the I/O operation that threatens to fail the system's replication of data from the data cluster to the other data cluster, and 3) in response to detecting the failure, ship the I/O operation from a node originally responsible for servicing the I/O operation to another node to complete the I/O operation without failing the system's replication of data from the data cluster to the other data cluster.

As will be explained in greater detail below, by shipping a failing I/O operation from a node that is originally responsible for servicing the I/O operation to another node capable of servicing the I/O operation, the systems and methods described herein may complete the I/O operation in question without having to fail data replication. As such, the systems and methods described herein may thereby avoid the latency and performance problems associated with replication failure. For example, the systems and methods may avoid having to completely resynchronize data between an original (i.e., primary) data cluster and a destination (i.e., secondary) data cluster. These systems and methods may also eliminate potential data inconsistencies on the destination data cluster due to replication failure.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
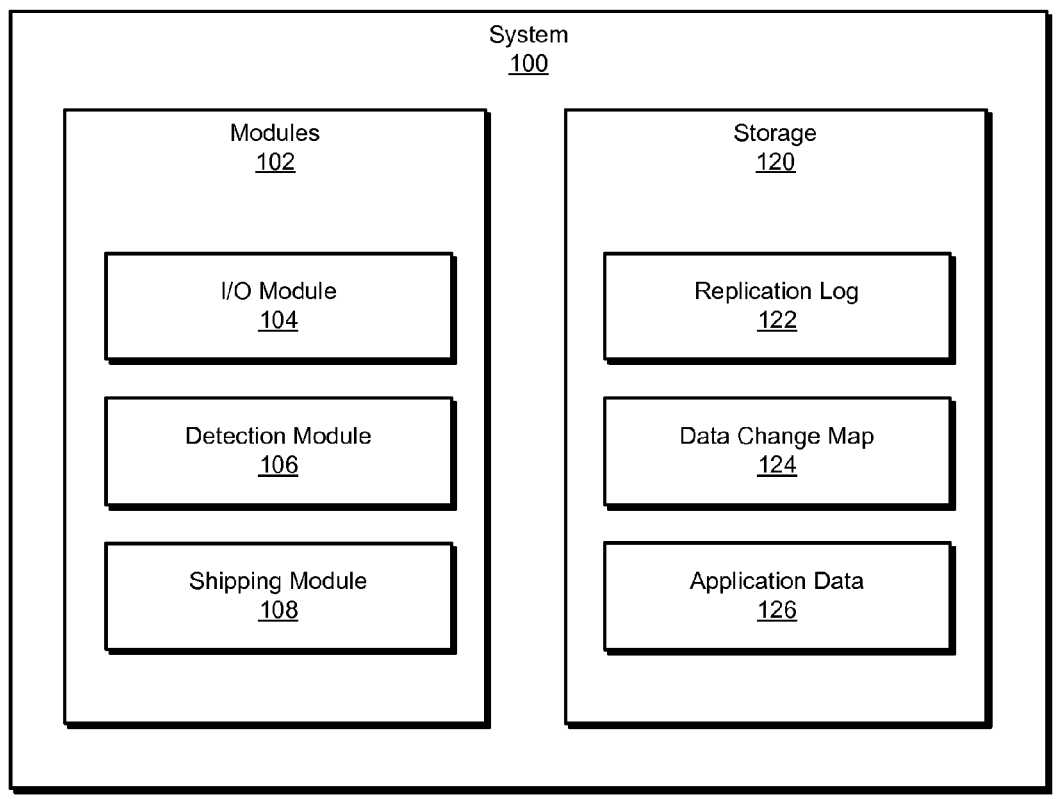
FIG. 1 is a block diagram of an exemplary system for shipping I/O operations to prevent replication failure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
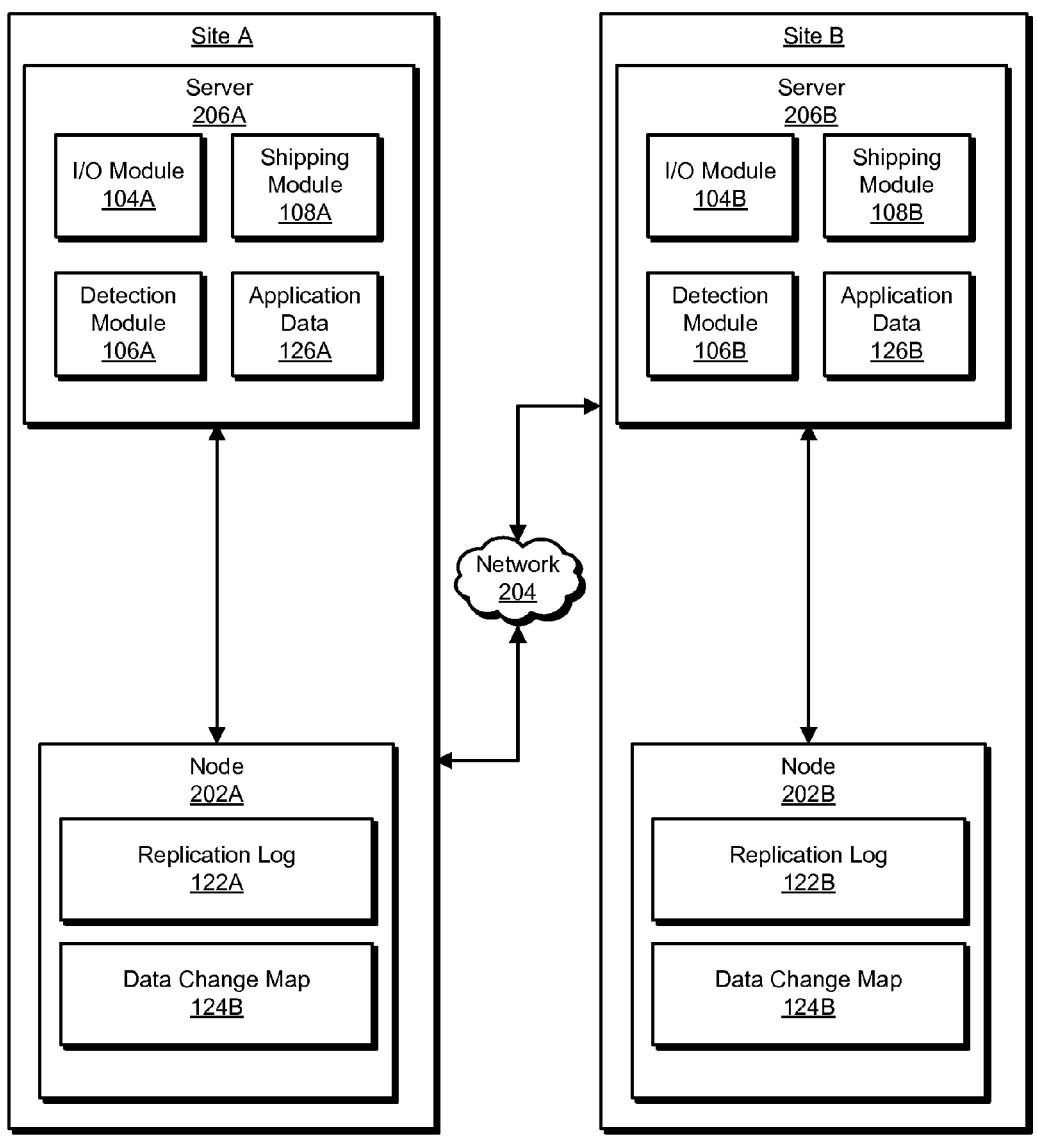
FIG. 2 is a block diagram of an exemplary system for shipping I/O operations to prevent replication failure.

The following will provide, with reference to FIGS. 1-2, detailed descriptions of exemplary systems for shipping I/O operations to prevent replication failure. Detailed descriptions of corresponding computer-implemented methods will also be provided in connection with FIG. 3. Detailed descriptions of exemplary data clusters, including primary and secondary data clusters, will be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for shipping I/O operations to prevent replication failure. As illustrated in this figure, exemplary system 100 may include one or more modules 102 for performing one or more tasks. For example, and as will be explained in greater detail below, exemplary system 100 may include an I/O module 104 programmed to attempt to perform an I/O operation in a system configured to replicate data from a data cluster to another data cluster. Exemplary system 100 may also include a detection module 106 programmed to detect a failure in at least part of the attempt to perform the I/O operation that threatens to fail the system's replication of data from the data cluster to the other data cluster.

In addition, and as will be described in greater detail below, exemplary system 100 may include a shipping module 108 programmed to ship, in response to detecting the failure, the I/O operation from a node originally responsible for servicing the I/O operation to another node to complete the I/O operation without failing the system's replication of data from the data cluster to the other data cluster. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., nodes 202A and 202B and/or servers 206A and 206B), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more storage devices, such as storage 120. In one example, storage 120 may be configured to store replication log 122. Replication log 122 may record I/O operations performed on storage units. Storage 120 may also be configured to include data change map 124. Data change map 124 may indicate where data differs between an originating data cluster and another data cluster that replicates the originating cluster's data. Storage 120 may also include application data 126 associated with one or more applications.

Storage 120 may represent portions of a single storage device or a plurality storage devices. For example, storage 120 may represent a portion of servers 206A or 206B in FIG. 2, computing system 610 in FIG. 6, and/or portions of exemplary network architecture 700 in FIG. 7. Alternatively, storage 120 in FIG. 1 may represent one or more physically separate devices capable of being accessed by a computing device, such as servers 206A and 206B in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include nodes 202A and 202B in communication with respective servers 206A and 206B via a network 204.

In one embodiment, one or more of modules 102 from FIG. 1 may, when executed by at least one processor of node 202A, enable shipping I/O operations to prevent replication failure by node 202A. For example, and as will be described in greater detail below, one or more of modules 102 may cause node 202A to 1) attempt to perform an I/O operation in a system configured to replicate data from a data cluster to another data cluster, 2) detect a failure in at least part of the attempt to perform the I/O operation that threatens to fail the system's replication of data from the data cluster to the other data cluster, and 3) in response to detecting the failure, ship the I/O operation from a node originally responsible for servicing the I/O operation to another node to complete the I/O operation without failing the system's replication of data from the data cluster to the other data cluster.

In the example of FIG. 2, servers 206A and 206B may manage replication of data between nodes 202A and 202B at respective sites A and B. Nodes 202A and 202B may both (or either) represent nodes in a data cluster. As used herein, a data cluster is defined as a plurality of nodes, such as separate client terminals or storage devices, configured to access at least one shared storage unit. In the example of FIG. 2, the data cluster of node 202A may replicate data from node 202A to node 202B. Instead of servers 206A and 206B, one of nodes 202A and 202B may alternatively, or additionally, manage the replication of data. Replication may be host-based (i.e., managed by servers 206 and/or 206B), fabric-based (i.e., managed via a network 204), and/or array-based (i.e., managed via nodes 202A and/or 202B).

Nodes 202A and 202B generally represent any type or form of computing system capable of reading computer-executable instructions. Examples of nodes 202A and 202B include, without limitation, laptops, tablets, desktops, servers, cellular phones, personal digital assistants (PDAs), multimedia players, embedded systems, combinations of one or more of the same, exemplary computing system 610 in FIG. 6, or any other suitable computing or storage device.

Servers 206A and 206B generally represent any type or form of computing device that is capable of managing replication of data between data clusters. Examples of servers 206A and 206B include, without limitation, application servers and database servers configured to provide various database services and/or run certain software applications.

Network 204 may include a storage network or storage array network, and generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between nodes 202A or 202B and servers 206A and B.

Figure 3:
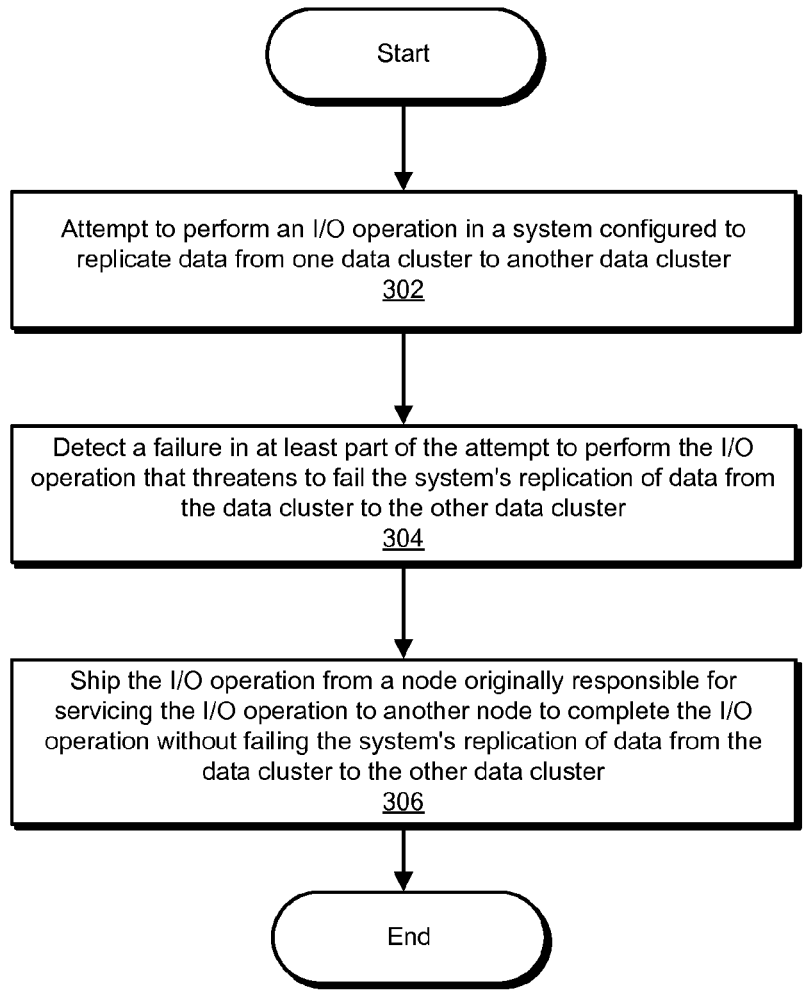
FIG. 3 is a flow diagram of an exemplary method for shipping I/O operations to prevent replication failure.

FIG. 3 is a flow diagram of an exemplary computer-implemented method 300 for shipping I/O operations to prevent replication failure. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

At step 302, one or more of the systems described herein may attempt to perform an I/O operation in a system configured to replicate data from a data cluster to another data cluster. For example, at step 302, I/O module 104 may attempt to perform an I/O operation in a system configured to replicate data from a data cluster to another data cluster. As used herein, the term "I/O operation" is defined as at least an input, read, output, and/or write operation.

Figure 4:
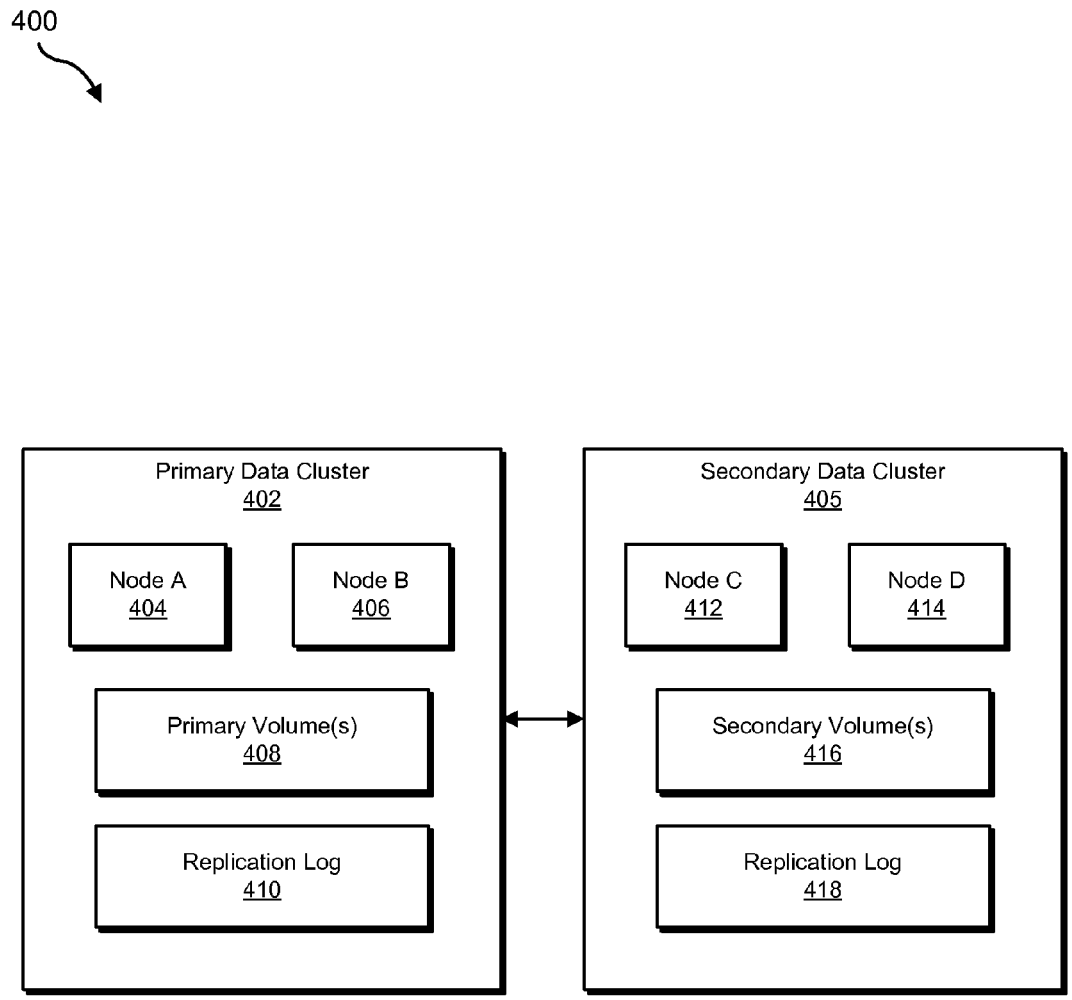
FIG. 4 is a block diagram of an exemplary system for replicating data between two data clusters.

FIG. 4 illustrates a system 400 configured to replicate data from a data cluster (i.e., primary data cluster 402) to another (i.e., secondary data cluster 405). In this example, system 400 may intercept writes performed by an application, such as a database program or file system, at primary data cluster 402. System 400 may then replicate the intercepted writes to secondary data cluster 405. System 400 may also include one or more replication logs, such as replication logs 410 and 418, to record I/O operations.

As shown in FIG. 4, I/O module 104 may attempt to perform an I/O operation in a variety of manners and/or on a variety of devices or data structures. For example, I/O module 104 may attempt to perform the I/O operation on one or more primary volume(s) 408 of primary data cluster 402. In this case, the node originally responsible for servicing the I/O operation may include a node within the data cluster (i.e., primary data cluster 402).

In some examples, I/O module 104 may attempt to perform the I/O operation on primary volume(s) 408 as part of performing application I/O. For example, an application running on a node of primary data cluster 402, such as node A 404 or node B 406, may perform I/O operations during its execution. The application may be configured to perform these I/O operations on primary volume(s) 408 of primary data cluster 402.

Secondary data cluster 405 may have a similar collection of nodes, such as nodes C 412 and D 414. In case of a failure or disaster at primary data cluster 402, which prevents an application from accessing data on primary volume(s) 408, the application may be restarted on nodes C 412 and D 414 to access the replicated data on secondary volume(s) 416.

In some examples, the node originally responsible for servicing the I/O operation may include a node within the other data cluster (i.e., secondary data cluster 405). For example, I/O module 104 may attempt to perform the I/O operation on one or more secondary volume(s) 416 of secondary data cluster 405.

In one embodiment, I/O module 104 may attempt to perform the I/O operation on secondary volume(s) 416 as part of replication I/O. For example, system 400 may be configured to replicate any or all I/O operations performed by an application on primary volume(s) 408 to secondary volume(s) 416. I/O module 104 may attempt to perform the I/O operation on secondary volume(s) 416 before, during (i.e., simultaneously), or after performing the same (or corresponding) I/O operation on primary volume(s) 408.

In some embodiments, system 400 may also implement a replication log. The replication may include a circular buffer of writes, which preserves the order of writes at the primary data cluster. The replication log ensures that writes are performed in the same order at both primary data cluster 402 and secondary data cluster 405.

I/O module 104 may also attempt to perform the I/O operation on a replication log, such as replication log 410 or 418. The replication log and corresponding data volume(s) (e.g., log 410 and volume(s) 408) may be stored on separate storage devices. In some embodiments, the replication log may receive the attempt to perform the I/O operation. For example, I/O module 104 may perform an I/O operation on replication log 410 to record a corresponding I/O operation on primary volume(s) 408. I/O module 104 may perform the I/O operation on replication log 410 before performing the corresponding operation on primary volume(s) 408.

In one example, the replication log may represent a bunker replication log for bunker-based replication. In bunker-based replication, the data cluster (e.g., primary data cluster 402) and the other data cluster (e.g., secondary data cluster 405) may be physically isolated from each other. Because the data clusters are physically isolated from each other, a disaster at one cluster (e.g., a fire) will not necessarily cause the other cluster to fail. In the case of storage-based bunker replication, the I/O operation may be shipped to a node that has access to storage. In the case of server-based bunker replication, the I/O operation may generally be shipped to another node within a multi-node cluster.

I/O module 104 may also attempt to perform the I/O operation on a data change map. The data change map may indicate where data differs between the data cluster (e.g., primary data cluster 402) and the other data cluster (e.g., secondary data cluster 405). System 400 may use the data change map to track writes when the replication log overflows. In one example, the data change map may be a bitmap. In addition, the data change map may only become active after the replication log overflows or fails.

Although FIG. 4 focuses on the example of replicating data between two data clusters, the system may alternatively be configured to replicate data between a data cluster and a single computing system or node. In this example, the data cluster may include the primary site, and the single computing system or node may include the secondary site, or vice versa. Steps 302 and 304 would be performed substantially the same for a system with just one data cluster as in the example of FIG. 4 with two data clusters. If the data cluster includes the primary or secondary site, the I/O operation may be shipped, according to step 306 (discussed below), between nodes of the data cluster.

Returning to FIG. 3, at step 304, one or more of the systems herein may detect a failure in at least part of the attempt to perform the I/O operation that threatens to fail the system's replication of data from the data cluster to the other data cluster. For example, at step 304, detection module 106 may detect a failure in at least part of the attempt to perform the I/O operation that threatens to fail the system's replication of data from the data cluster to the other data cluster. As used herein, the term "threatens to fail" is defined as "would cause to fail unless the system takes remedial action, including shipping the I/O operation."

Detection module 106 may detect a failure in at least part of the attempt to perform the I/O operation in a variety of manners. For example, detection module 106 may detect a failure to access primary volume(s) 408 such as, for example, during application I/O.

Detection module 106 may also detect a failure to access secondary volume(s) 416. For example, detection module 106 may detect a failure to access secondary volume(s) 416 during replication I/O that replicates data from primary data cluster 402 to secondary data cluster 405.

Either of primary and secondary volume(s) 408 and 416 may be a receiving data volume that receives the original attempt by I/O module 104 to perform the I/O operation. In the case of primary volume(s) 408, the failure may include a failure to write to the receiving data volume after the write has been recorded in replication log 410.

Detection module 106 may also detect a failure to access the replication log, such as replication logs 410 and 418. For example, detection module 106 may detect that I/O module 104 fails to access replication logs 410 and/or 418 to record writes to be performed on primary data volume(s) 408.

Detection module 106 may also detect the failure during a recovery operation that attempts to recover replicated data in response to a previous failure. Similarly, detection module 106 may detect the failure during at least one of: 1) an initial synchronization operation that automatically performs synchronization to ensure that the other data cluster is up to date with the data cluster, 2) a full synchronization operation that transfers all data between the data cluster and the other data cluster, and 3) an incremental or differential sync operation that transfers only differing data between the data cluster and the other data cluster.

Returning to FIG. 3, at step 306, one or more of the systems herein may, in response to detecting the failure, ship the I/O operation from a node originally responsible for servicing the I/O operation to another node to complete the I/O operation without failing the system's replication of data from the data cluster to the other data cluster. For example, at step 306, shipping module 108 may ship, in response to detecting the failure, the I/O operation from a node originally responsible for servicing the I/O operation to another node to complete the I/O operation without failing the system's replication of data from the data cluster to the other data cluster. As used herein, the phrase "shipping the I/O operation" is defined as transferring a command to perform the I/O operation from an original node (i.e., the node that originally attempts to perform the I/O operation) in a data cluster to another node in the data cluster.

Shipping the I/O operation may be desirable when the original node experiences failure in at least part of the attempt to perform the I/O operation. In that case, shipping module 108 may ship the I/O operation to another node that is not experiencing the failure (or other performance problems). The other node may then complete the I/O operation without failing replication.

Shipping module 108 may ship the I/O operation to another node in a variety of manners. In one example, shipping module 108 may only ship the I/O operation if the performance impact of shipping the I/O operation satisfies various performance-related criteria. For example, shipping module 108 may determine the performance impact of shipping the I/O operation from the node originally responsible for servicing the I/O operation to the other node. Shipping module 108 may then determine that the performance impact of shipping the I/O operation from the node originally responsible for servicing the I/O operation to the other node satisfies at least one performance-related criteria.

The performance-related criteria may include a latency threshold, a CPU usage threshold, and/or a bandwidth threshold. Shipping module 108 may determine whether the performance impact satisfies the performance-related criteria in part by considering the other demands on network 204, primary data cluster 402, secondary data cluster 405, their data volume(s) 408 and/or 416, and/or their replication logs 410 and/or 418.

In some examples, evaluating the performance impact of shipping I/O may include considering whether the I/O operation includes application I/O or replication I/O. Application I/O may refer to an application writing directly to primary data cluster 402. In contrast, replication I/O may refer to replicating data (e.g., application data already recorded in primary volume(s) 408) to secondary data cluster 405. Application I/O may be more time sensitive than replication I/O. Accordingly, shipping module 108 may only ship the I/O operation if it represents a replication I/O operation associated with the system's replication of data from the data cluster to the other data cluster, as opposed to an application I/O operation associated with servicing an application.

In some embodiments, shipping module 108 may determine (e.g., after considering the performance impact of shipping the I/O operation) that the performance impact of shipping the I/O operation from the node originally responsible for servicing the I/O operation to the other node fails to satisfy the performance-related criteria. In response, shipping module 108 may gracefully stop, on a node where the failure occurred, an application that caused the attempt to perform the I/O operation. As used herein, the term "gracefully stop" is defined as "stop without substantial data loss and without replication failure."

In some examples, shipping module 108 may only ship the I/O operation if the failure represents a non-permanent (i.e., temporary) and/or non-global (i.e., local) failure. In other words, shipping module 108 may refrain from shipping the I/O operation if the failure is permanent and/or global.

Figure 5:
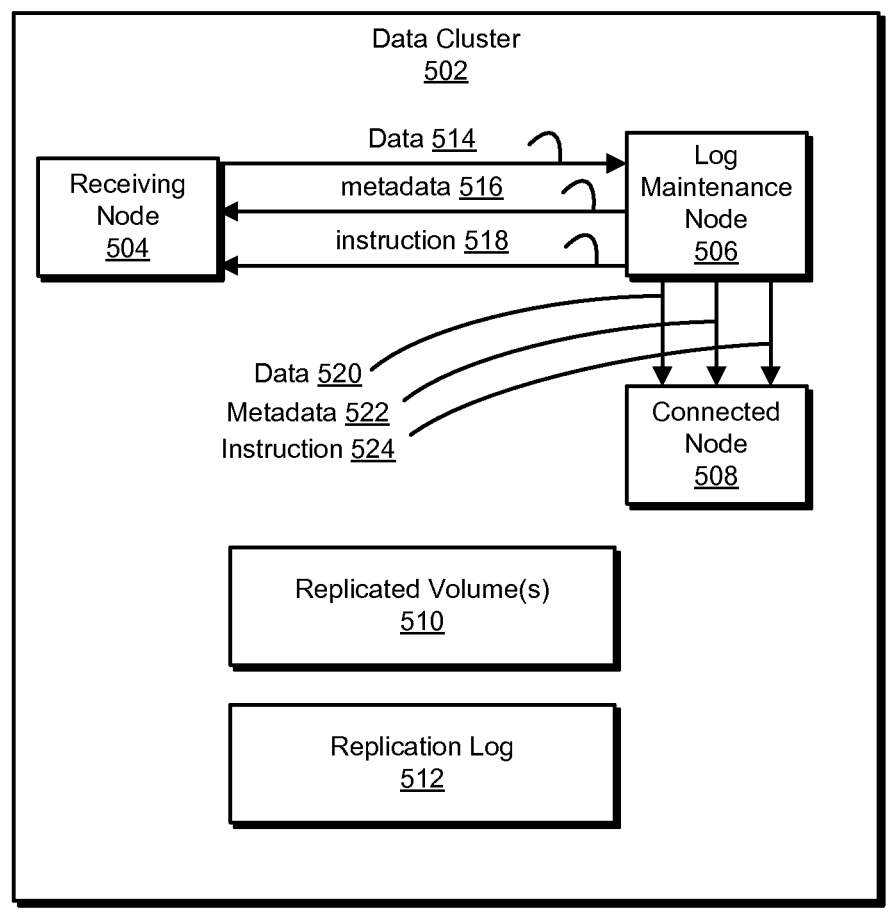
FIG. 5 is a block diagram of an exemplary data cluster that may ship an I/O operation in response to a detected failure.

FIG. 5 illustrates a data cluster 502 in which shipping module 108 may ship the I/O operation. Data cluster 502 may include a receiving node 504, a log maintenance node 506, and a connected node 508, as well as replicated volume(s) 510 and a replication log 512. Log maintenance node 506 may be a node assigned to manage replication log 512, and any node may be assigned as a log maintenance node. Designating a node (such as node 506) as log maintenance node allows system 200 to preserve the order of writes to the log maintenance node (e.g., on a primary site).

As shown in FIG. 5, receiving node 504 may receive an I/O operation. FIG. 5 focuses on the case that data cluster 502 is a primary data cluster, but data cluster 502 may also be a secondary. In the case that data cluster 502 is a primary data cluster, shipping module 108 may ship the I/O operation by shipping an application I/O operation associated with servicing an application. For example, shipping module 108 may ship the write preserved in replication log 512 to the other node. Additionally or alternatively, shipping module 108 may ship an I/O operation to be performed on replication log 512 so that the I/O operation is performed on replication log 512 by the other node.

In some examples, shipping module 108 may ship the I/O operation based on whether receiving node 504 is the log maintenance node, and based on the type of replication used. For example, the receiving node may require log maintenance node status to perform the I/O operation. Log maintenance node status may be required in synchronous mode. Synchronous mode may ensure that a write has been posted to the secondary and primary data clusters before the write completes at the application level. When replicating in synchronous mode, the data on the secondary is completely up-to-date. If a disaster occurs at the primary, data can be recovered from any surviving secondary without any loss. Synchronous replication provides data currency but can impact application performance in high latency or limited bandwidth environments. The response time experienced by the application may be affected because the write may wait for the secondary to acknowledge it before the write can complete on the primary.

In synchronous mode, shipping module 108 may ship all writes to the log maintenance node if they are not received at the log maintenance node. In the example of FIG. 5, receiving node 504 receives the I/O operation, but receiving node 504 is not assigned to maintain replication log 512. Log maintenance node 506 performs that function. Accordingly, shipping module 108 may ship (at 514) the I/O operation to log maintenance node 506.

In contrast, receiving node 504 may perform the received I/O operation itself in asynchronous mode. Asynchronous mode may be useful when it is acceptable for the secondary to not be up-to-date. When replicating in asynchronous mode, an update to primary volume(s) 408 is complete when the update has been recorded in the primary log 410. Asynchronous mode may not guarantee that the data is current at all times. However, asynchronous mode may have less impact on application performance than synchronous mode, and may provide the ability to use more cost-effective telecommunications. In asynchronous mode, all completed updates to primary volume(s) 408 may be guaranteed to be made on secondary data volume(s) with some delay.

If receiving node 504 attempts to perform the I/O operation itself, as in asynchronous mode, receiving node 504 may require log metadata to write to replication log 512. Accordingly, receiving node 504 may request 516 the log metadata from log maintenance node 506. The metadata may indicate the position in replication log 512 that was assigned to the corresponding write, and how much space is allocated (e.g., how much space is allocated for the write and/or to replication log 512).

In the example of FIG. 5, receiving node 504 is not the log maintenance node, but log maintenance node 506 may also receive I/O operations to perform. In that case, log maintenance node 506 may perform the I/O operation itself (e.g., in either synchronous or asynchronous mode).

The node attempting to perform the I/O operation, which may be either receiving node 504 (e.g., in asynchronous mode) or log maintenance node 506 (e.g., in synchronous mode), may experience a failure in at least part of the attempt to perform the I/O operation. Detection module 106 may detect the failure at step 304, as explained above. In response, shipping module 108 may ship the I/O operation from the node experiencing the failure to another node. If log maintenance node 506 attempts to perform the I/O operation and experiences a failure, then shipping module 108 may switch a log maintenance role associated with the replication log from a current node (i.e., log maintenance node 506) to a different node. The log maintenance role can be transferred without performing I/O shipping, but that will incur a performance or overhead cost, as discussed above (due to, e.g., restarting replication). I/O shipping avoids that associated performance or overhead cost.

If the originating node experiences a failure in accessing only one of replicating volume(s) 510 and replication log 512, shipping module 108 may ship only the I/O operation associated with the failure. For example, shipping module 108 may only ship the write to replication log 512, if the originating node fails to access the replication log, while allowing the originating node to perform the corresponding I/O operation on replicated volume(s) 510 (and vice versa).

For example, in asynchronous mode, if receiving node 504 experiences a failure when attempting to access replicated volume(s) 510, shipping module 108 may ship 514 the I/O operation to log maintenance node 506 (analogous to how the receiving node always ships the I/O operation in synchronous mode). Similarly, in synchronous mode, if log maintenance node 506 experiences a failure in attempting to access replicated volume(s) 510, log maintenance node 506 may ship the I/O operation back to receiving node 504 (analogous to how receiving node always performs the I/O operation in asynchronous node). In general, shipping module 108 may perform I/O shipping in response to the failure in part by causing at least a partial deviation from synchronous mode to asynchronous mode, or vice versa, to complete the I/O operation without failing replication.

Shipping module 108 may ship the I/O operation by transferring only the minimum amount of data necessary for the destination (e.g., "other") node to complete the I/O operation without failing replication. For example, if the other node already possesses the data for writing, shipping module 108 may ship the I/O operation by simply instructing the other node to write the data that the node already possesses. In synchronous node, if log maintenance node 506 experiences a failure after receiving the I/O operation from receiving node 504, receiving node 504 may still possess the data to be written. In that case, I/O module 108 may ship the I/O operation by just instructing 518 receiving node 504 to perform the I/O operation itself. If the I/O operation is to be performed on replication log 512, shipping module 108 may also ship the I/O operation in part by transferring 516 log metadata to receiving node 504.

Shipping module 108 may also ship the I/O operation to a different node than receiving node 504 and log maintenance node 506. For example, shipping module 108 may ship the I/O operation to connected node 508. Shipping module 108 may ship the I/O operation by transferring data 520, 522, and/or a mere instruction 524 to connected node 508. Shipping module 108 may also ship the I/O operation in part by transferring data, metadata, and/or a mere instruction between receiving node 504 and another node not assigned to log maintenance, such as connected node 508.

In the example of FIG. 5, connected node 508 is connected to replicated volume(s) 510 and/or replication log 512 so that connected node 508 can complete the I/O operation (i.e., when the originating node failed to connect or access replicated volume(s) 510 and/or replication log 512). Alternatively, a destination node to which shipping module 108 has shipped the I/O operation may also experience a failure. Accordingly, shipping module 108 may continue shipping the I/O operation until the I/O operation is completed without replication failure or all nodes in data cluster 502 are exhausted. Shipping module 108 may also stop shipping the I/O operation, and fail replication, after a (static or dynamically calculated) number of shippings.

In any cluster with more than two nodes, shipping module 108 may have a choice about where to ship the I/O operation. Accordingly, shipping module 108 may ship the I/O operation in part by determining which node to which to ship the I/O operation. Shipping module 108 may determine which node to which to ship the I/O operation based on the connectivity, resources, bandwidth, past performance, and/or workload of candidate nodes (or any other suitable criteria). Shipping module 108 may search for a sufficient and/or optimal destination node by evaluating all potential nodes, or by evaluating only an initial or default set of node(s) and then only expanding the search in case no sufficient node is found in the default set (e.g., using a breadth first or any other network traversal heuristic).

In some examples, shipping module 108 may confirm that the destination node can successfully complete the I/O operation without failing replication prior to shipping the I/O operation. Alternatively, shipping module 108 may ship the I/O operation to an arbitrary, default, and/or estimated node. In that case, shipping module 108 may ship the I/O operation in part by instructing the destination node to further ship the I/O operation to another candidate node in case the destination node experiences a failure. Shipping module 108 may ship the I/O operation in part by providing instructions to the destination node on how to select another destination node, for another shipping of the I/O operation, in case that the destination node cannot complete the I/O operation without failing replication.

As explained above, by shipping a failing I/O operation from a node that is originally responsible for servicing the I/O operation to another node capable of servicing the I/O operation, the systems and methods described herein may complete the I/O operation in question without having to fail data replication. As such, the systems and methods described herein may thereby avoid the latency and performance problems associated with replication failure. For example, the systems and methods may avoid having to completely resynchronize data between an original (i.e., primary) data cluster and a destination (i.e., secondary) data cluster. These systems and methods may also eliminate potential data inconsistencies on the destination data cluster due to replication failure.

Figure 6:
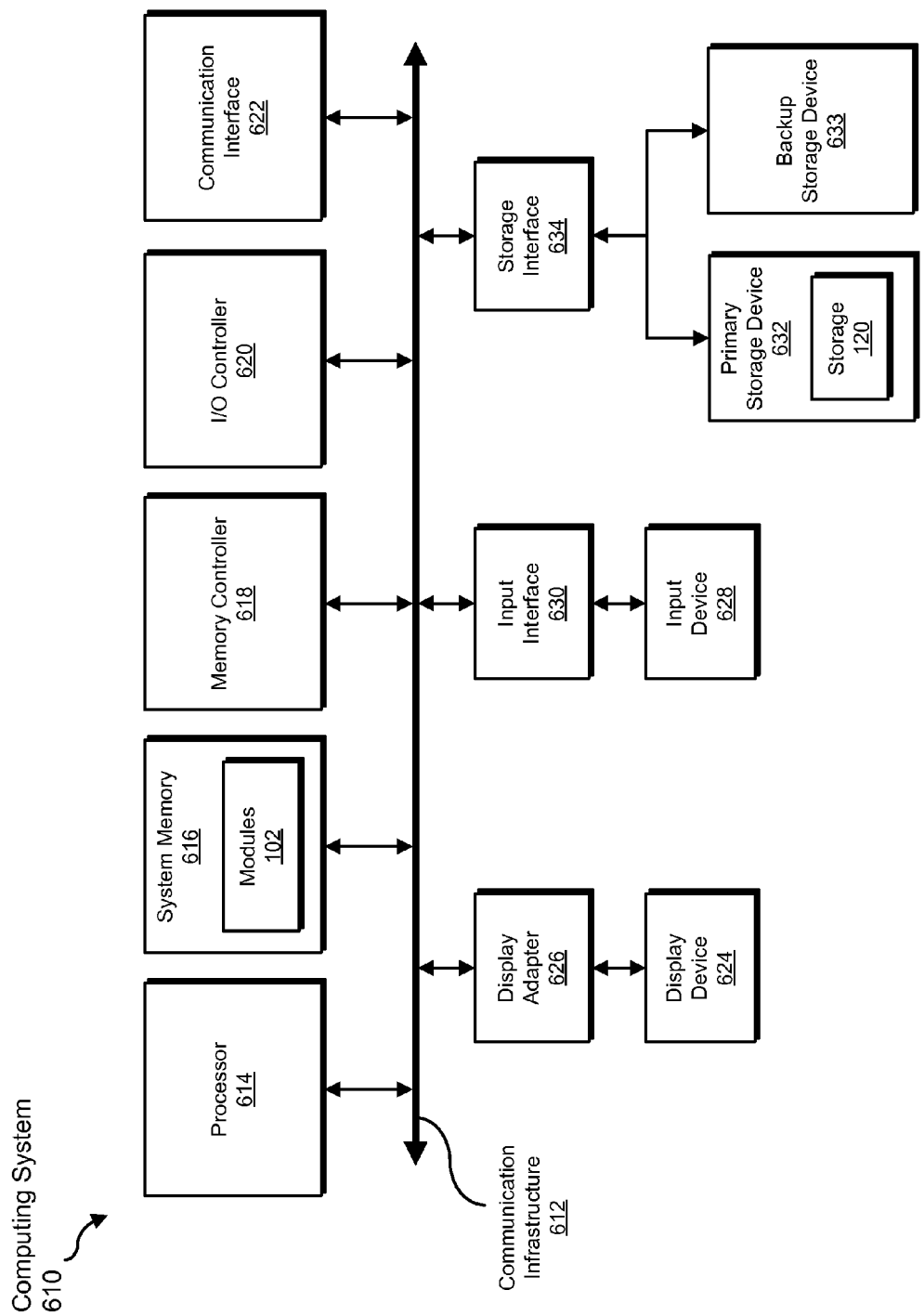
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the attempting, detecting, shipping, determining, and stopping steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, storage 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
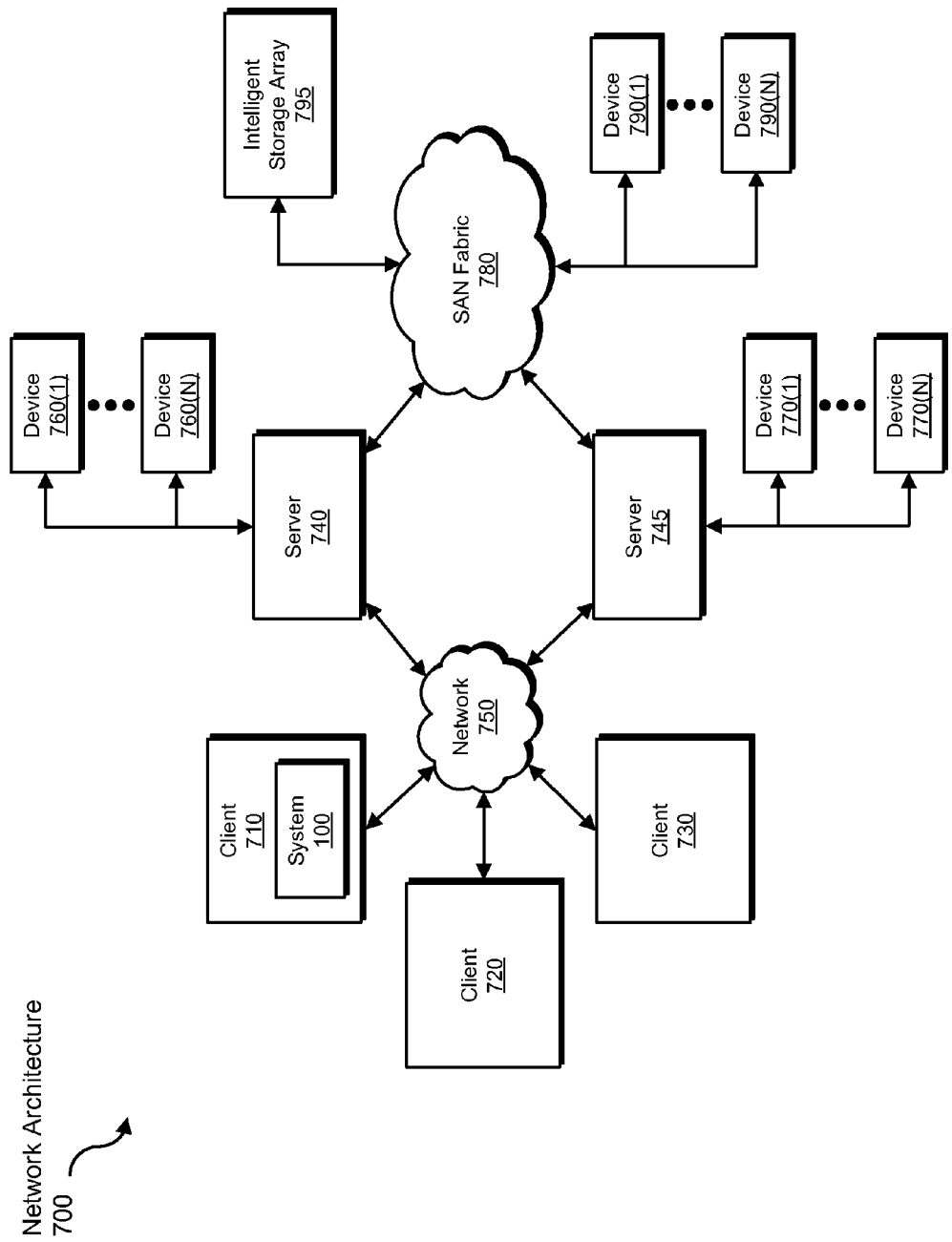
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the attempting, detecting, shipping, determining, and stopping steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for shipping I/O operations to prevent replication failure.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a data cluster from a state of needing to fail replication to a state of complete replication without failure.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for shipping I/O operations to prevent replication failure, at least a portion of the method being performed by a computing device comprising at least one processor, the method comprising:
   attempting to perform an I/O operation in a system configured to replicate data from a data cluster to another data cluster;
   detecting a failure in at least part of the attempt to perform the I/O operation that threatens to fail the system's replication of data from the data cluster to the other data cluster;
   prior to shipping the I/O operation:
      determining a performance impact of shipping the I/O operation from a node originally responsible for servicing the I/O operation to another node within the same data cluster;
      determining that the performance impact of shipping the I/O operation from the node originally responsible for servicing the I/O operation to the other node within the same data cluster satisfies at least one performance-related criterion;
   shipping the I/O operation, in response to detecting the failure in at least part of the attempt to perform the I/O operation that threatens to fail the system's replication of data from the data cluster to the other data cluster, from the node originally responsible for servicing the I/O operation to the other node within the same data cluster to complete the I/O operation without failing the system's replication of data from the data cluster to the other data cluster, wherein:
   the performance-related criterion includes at least one of a latency threshold, a CPU usage threshold, and a bandwidth threshold.

2. The computer-implemented method according to claim 1,
   further comprising determining, at a later point in time, that the performance impact of shipping the I/O operation from the node originally responsible for servicing the I/O operation to the other node within the same data cluster fails to satisfy the performance-related criterion.

3. The computer-implemented method according to claim 2, further comprising
   gracefully stopping, on a node where the failure occurred, an application that caused the attempt to perform the I/O operation.

4. The computer-implemented method according to claim 1, wherein shipping the I/O operation comprises:
   determining that the I/O operation comprises a replication I/O operation associated with the system's replication of data from the data cluster to the other data cluster, as opposed to an application I/O operation associated with servicing an application;
   shipping the I/O operation in response to the determination.

5. The computer-implemented method according to claim 1, wherein the node originally responsible for servicing the I/O operation comprises a node within the other data cluster.

6. The computer-implemented method according to claim 5, wherein shipping the I/O operation comprises:
   determining that the failure is at least one of non-permanent and non-global;
   shipping the I/O operation in response to the determination.

7. The computer-implemented method according to claim 1, wherein the detection of the failure occurs during at least one of:

an initial synchronization operation that automatically performs synchronization to ensure that the other data cluster is up to date with the data cluster;

a full synchronization operation that transfers all data between the data cluster and the other data cluster;

a differential synchronization operation that transfers only differing data between the data cluster and the other data cluster.

8. The computer-implemented method according to claim 1, wherein the system implements a replication log.

9. The computer-implemented method according to claim 8, wherein the replication log comprises a bunker replication log for bunker-based replication in which the data cluster and the other data cluster are physically isolated from each other.

10. The computer-implemented method according to claim 8, wherein the replication log, and a receiving data volume that receives the attempt to perform the I/O operation, are stored on separate storage devices.

11. The computer-implemented method according to claim 10, wherein the failure comprises a failure to access the receiving data volume.

12. The computer-implemented method according to claim 11, wherein:
the node originally responsible for servicing the I/O operation comprises a node within the data cluster;
the failure comprises a failure to write to the receiving data volume after the write has been recorded in the replication log;
shipping the I/O operation comprises shipping an application I/O operation associated with servicing an application;
the method further comprises shipping the write preserved in the replication log to the other node within the same data cluster.

13. The computer-implemented method according to claim 8, wherein the failure comprises a failure to access the replication log.

14. The computer-implemented method according to claim 13, wherein:
the I/O operation comprises an I/O operation on the replication log;
shipping the I/O operation comprises shipping the I/O operation so that the I/O operation is performed on the replication log by the other node within the same data cluster.

15. The computer-implemented method according to claim 13, further comprising, in response to detecting the failure, switching a log maintenance role associated with the replication log from a current node to a different node.

16. The computer-implemented method according to claim 1, wherein detecting the failure comprises detecting the failure during a recovery operation that attempts to recover replicated data in response to a previous failure.

17. The computer-implemented method according to claim 1, wherein the I/O operation comprises an I/O operation on a data change map, wherein the data change map indicates where data differs between the data cluster and the other data cluster.

18. A system for shipping I/O operations to prevent replication failure, the system comprising:
an I/O module programmed to attempt to perform an I/O operation in the system which is configured to replicate data from a data cluster to another data cluster;
a detection module programmed to detect a failure in at least part of the attempt to perform the I/O operation that threatens to fail the system's replication of data from the data cluster to the other data cluster;
a shipping module programmed to:
prior to shipping the I/O operation:
determine a performance impact of shipping the I/O operation from a node originally responsible for servicing the I/O operation to another node within the same data cluster;
determine that the performance impact of shipping the I/O operation from the node originally responsible for servicing the I/O operation to the other node within the same data cluster satisfies at least one performance-related criterion;
ship the I/O operation, in response to detecting the failure in at least part of the attempt to perform the I/O operation that threatens to fail the system's replication of data from the data cluster to the other data cluster, from the node originally responsible for servicing the I/O operation to the other node within the same data cluster to complete the I/O operation without failing the system's replication of data from the data cluster to the other data cluster;
at least one processor configured to execute the I/O module, the detection module, and the shipping module, wherein:
the performance-related criterion includes at least one of a latency threshold, a CPU usage threshold, and a bandwidth threshold.

19. The system according to claim 18, wherein the node originally responsible for servicing the I/O operation comprises a node within the other data cluster.

20. A non-transitory computer-readable-storage medium comprising one or more computer-executable instructions that, when executed by at least one processor of a computing device, cause the computing device to:
attempt to perform an I/O operation in a system configured to replicate data from a data cluster to another data cluster;
detect a failure in at least part of the attempt to perform the I/O operation that threatens to fail the system's replication of data from the data cluster to the other data cluster;
prior to shipping the I/O operation:
determine a performance impact of shipping the I/O operation from a node originally responsible for servicing the I/O operation to another node within the same data cluster;
determine that the performance impact of shipping the I/O operation from the node originally responsible for servicing the I/O operation to the other node within the same data cluster satisfies at least one performance-related criterion;
ship the I/O operation, in response to detecting the failure in at least part of the attempt to perform the I/O operation that threatens to fail the system's replication of data from the data cluster to the other data cluster, from the node originally responsible for servicing the I/O operation to the other node within the same data cluster to complete the I/O operation without failing the system's replication of data from the data cluster to the other data cluster, wherein:
the performance-related criterion includes at least one of a latency threshold, a CPU usage threshold, and a bandwidth threshold.

* * * * *